Patented Jan. 22, 1935

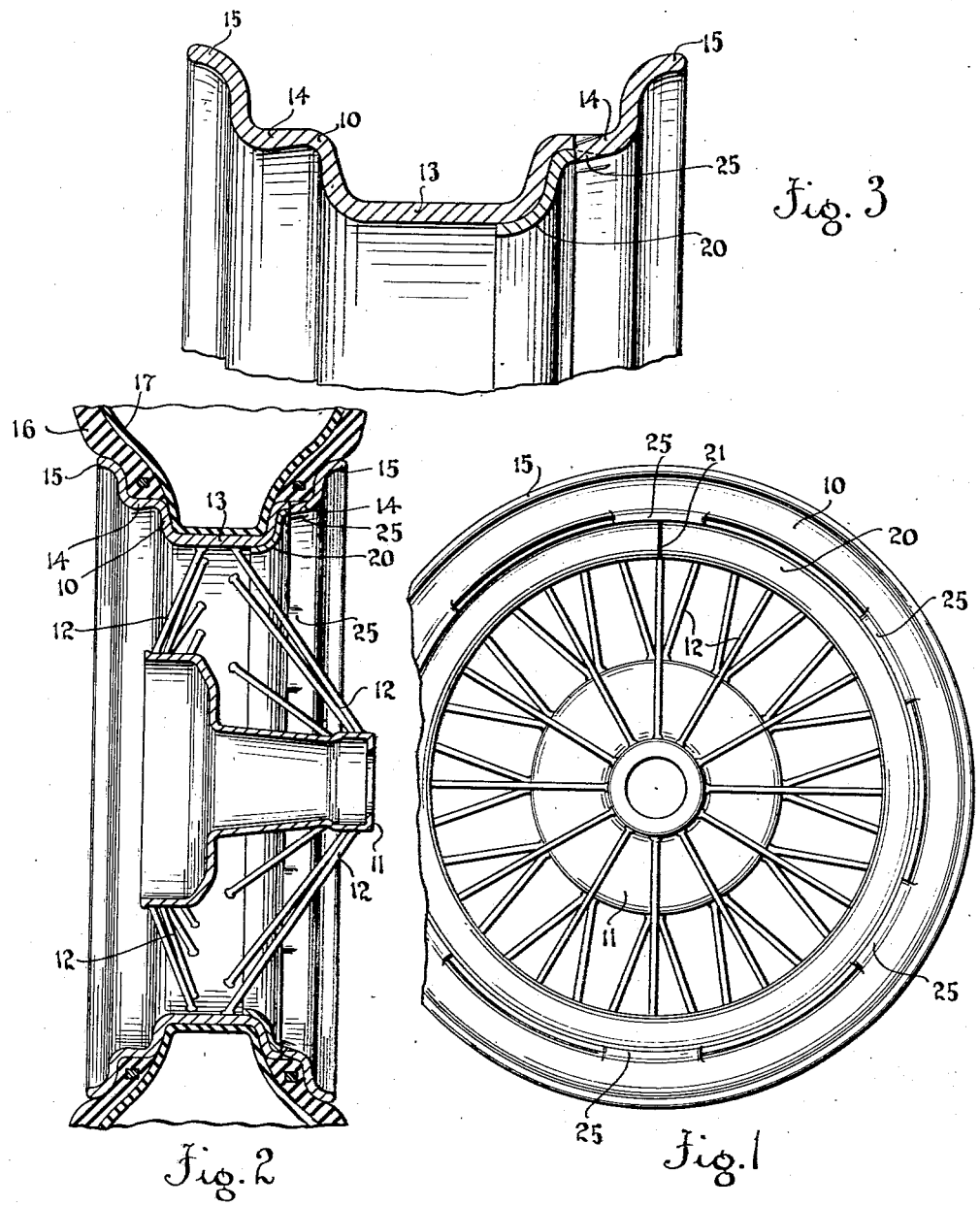

1,988,779

UNITED STATES PATENT OFFICE 1,988,779

TIRE RIM

Winfield S. Brink, Akron, Ohio, assignor to The Firestone Steel Products Company, Akron, Ohio, a corporation of Ohio Application November 9, 1931, Serial No. 573,907

3 Claims. (Cl. 41—10)

This invention relates to tire rims such as are used upon vehicle wheels for supporting pneumatic tires thereon, and more especially it relates to circumferentially decorated tire rims.

The decorating of tire rims having removable side rings or locking rings is a relatively simple matter requiring only that said rings be distinctively colored or plated. In tire rims that do not utilize side rings or locking rings, such as drop-center tire rims, the economical circumferential decorating thereof has required the application to the rim of a separate colored or plated ring, and it is to the improvement of means for mounting the decorating ring upon the rim that this invention is directed.

The chief objects of the invention are to provide for the facile mounting of a metal ring circumferentially of a tire rim; to provide a ring mounting that holds the ring securely in place yet permits ready removal thereof; and to avoid the adding of weight to the rim other than that of the decorated ring.

Of the accompanying drawing:

Figure 1 is a front elevation of a vehicle wheel comprising a drop-center tire rim embodying the invention in its preferred form;

Figure 2 is a vertical section thereof, and a tire on the rim, a part of the latter being broken away; and Figure 3 is a detail sectional view, on a larger scale, of the improved tire rim.

Referring to the drawing, 10 is a drop center tire rim, and 11 is a wheel hub and 12, 12 the wire spokes supporting the same. The rim 10 comprises the usual central circumferential groove or well 13, respective bead seats 14, 14 at each side thereof, and lateral flanges 15, 15 extending radially outward from said bead seats. Figure 2 shows a tire 16 and inner tube 17 mounted upon the rim.

The rim is decorated with a plated or colored ring 20, which ring may be endless but is shown herein as split at 21. The ring is applied to the outer lateral face of the rim, and covers the side of the well portion 13 of the rim, although it will be obvious that the ring may be positioned elsewhere upon the rim. The outer peripheral portion of the ring 20 abuts the inner peripheral face of a bead seat 14 of the rim, and said bead seat is locally deformed or struck out at a plurality of regions 25, 25 circumferentially of the rim to provide inwardly projecting tongues or lugs which are disposed in front of the outer edge of the ring so as to hold the ring securely in place upon the rim. The ring 20, whether endless or split, is easily sprung into place behind the lugs 25, and is as easily removed therefrom if desired.

The invention provides an economical means for affixing a decorative ring to a wheel, and adds nothing to the weight of the wheel.

Modification may be resorted to within the scope of the appended claims, which are not limited wholly to the specific construction shown and described.

What is claimed is:

1. The combination of a tire rim, and a decorative ring circumferentially mounted thereon and retained by a plurality of locally deformed portions of the rim.

2. The combination of a tire rim, and a concentric decorative ring mounted thereon and retained by a plurality of lugs struck out from the rim structure.

3. The combination of a drop center rim, and a concentric decorative ring mounted thereon and having its outer periphery disposed upon the inner periphery of a bead seat of the rim, said ring being held in place upon the rim by a circumferential series of retaining members struck out from the bead seat of the rim.

WINFIELD S. BRINK.